United States Patent [19]

McLaughlin et al.

[11] 4,126,766

[45] Nov. 21, 1978

[54] 3-PORT CONFERENCE CIRCUIT FOR USE IN PRIVATE AUTOMATIC BRANCH EXCHANGE

[75] Inventors: Donald W. McLaughlin, Naperville; Gerald F. Fetterer, Mount Prospect, both of Ill.

[73] Assignee: GTE Automatic Electric Laboratories Incorporated, Northlake, Ill.

[21] Appl. No.: 857,165

[22] Filed: Dec. 5, 1977

[51] Int. Cl.² .............................................. H04M 3/56
[52] U.S. Cl. .................................................. 179/18 BC
[58] Field of Search ..................................... 179/18 BC

[56] References Cited

U.S. PATENT DOCUMENTS 4,007,338  2/1977  McLaughlin .................... 179/18 BC Primary Examiner—William C. Cooper

[57] ABSTRACT

An improved conference technique whereby a number of channels in a telephone switching system employing pulse code modulation for transmission purposes are combined so that a number of subscribers may participate in a common telephone conversation. The conference circuit is provided with a continuous threshold to pass the primary signal and to exclude the reflection. It is only used in the selection process, and for conditions which do not provide the threshold being met, the previous speaker is retained.

8 Claims, 2 Drawing Figures

3-PORT CONFERENCE CIRCUIT FOR USE IN PRIVATE AUTOMATIC BRANCH EXCHANGE

BACKGROUND OF THE INVENTION

1. Field of the Invention

This invention relates generally to transmission and switching techniques in telephone communication systems and, more particularly, to an improved conference technique whereby a number of channels in a telephone switching system employing pulse code modulation for transmission purposes are combined so that a number of subscribers may participate in a common telephone conversation. More particularly still, it relates to improvements in a three-port conference circuit of the type disclosed in U.S. Pat. Nos. 3,699,264 and 4,007,338, both of which are assigned to the same assignee as the present invention.

The present invention pertains to a three-port conference circuit for use in a private automatic branch exchange similar to those units manufactured by GTE Automatic Electric Incorporated and designated GTD120. Circuitry with minimum modification could also be employed in class five central offices that employ digital switching. Such telephone systems employ a time switching network rather than the most prevalent earlier space divided switching network.

In time division switching networks a requirement exists to have sources of pulse code modulated voice samples associated with time slots. These time slots allow the conference to sequentially receive the code for each conferee. For the conference circuit to be effective, it must be able to recognize who the conferees are and, of course, who is not associated with the conference. The circuitry must also be capable of distributing the conference speaker's code to each conferee. Information of this sort is, of course, available in the telephone switching systems referred to above. It should be understood that only telephone switching systems employing pulse code modulation can use the circuitry of the present invention, and such circuitry interfaces with time division portions of such switching networks. Other codes (linear) could be used, but a modified decision algorithm would have to be used, since in the present disclosure, D2/D3 type coding is required.

2. Description of the Prior Art

An approach to the handling of pulse code modulated information and conference circuitry is taught by U.S. Pat. Nos. 3,699,264 and 4,007,338, which are assigned to the same assignee as the present invention. In these noted patents, digital signals are not converted to analog; rather binary words are compared from the participating channels, with the smallest binary numbers (this corresponds to the largest analog signal) selected as the speaker. Various improvements in the conference circuitry disclosed in these above-identified U.S. patents are disclosed in U.S. Pat. Nos. 4,002,981 and 4,054,755, both of which are assigned to the same assignee as the present invention.

PCM conferencing as taught in the above-identified patents and application requires a source of pulse code modulated (PCM) coded voice samples which have associated time slots. These time slots allow the conference to sequentially receive a code for each conferee. The conference circuitry must be able to recognize who the conferees are and who is not associated with the conference call. The conference circuit, in U.S. Pat. No. 4,007,338, then determines the loudest PCM voice sample during each PCM time frame, storing and outputting the selected PCM code to all conferees. In other words, the binary words are compared from the participating channels, with the smallest binary members selected as the speaker. These patents, therefore, utilize a minimum binary code to select the speaker. This technique, called "instant speaker selection", for generating conferencing, however, is subject to degradation due to the presence of idle channel noise and from non-talking conferees with individual circuit DC offset voltage variations, as the speaker's audio signal passes through the region and its PCM sample is at a high weight value. In addition, when two or more conference members are conversing simultaneously, the conference circuit could alternately select a new speaker for each time frame, thus degrading the quality of the speech of conversing conferees.

In U.S. Pat. No. 4,022,981, an improved multi-port (beyond 3) conference circuit is disclosed utilizing a minimum binary code as employed in the coding formats (D2 and D3) currently employed in pulse code modulated telephony. Generally, the method for choosing the speaker is to clear the PCM buffers at time slot 94. Then the first conferee detected is loaded to a conferee register. The register is compared to a temporary speaker register. If the conferee code corresponds to a larger pulse amplitude modulated (PAM) sample (that is, it presents a smaller binary value PCM code), the conferee code is loaded into the temporary speaker register. Each new conferee code is loaded to the conferee register and then compared to the temporary speaker register. If it is smaller in binary value but larger in PAM, it is then transferred and becomes the new temporary speaker. If not, it is written over when the next conferee code is loaded in. Finally, time slot 94 occurs and the temporary speaker register is transferred to a conference speaker register. This then is the conference speaker for the next frame, and this register contains the PCM code which all conferees except the speaker himself will receive. It will then be updated one frame later during the next occurrence of time slot 94.

In U.S. Pat. No. 4,054,755, a further improvement in the multi-port conference circuitry is provided. These improvements attempt to solve the idle channel noise and circuit offset variation problem and, also, foreign signal protection (i.e., 60Hz signal longitudinally coupled to the line). In the conference circuit, PCM samples are taken for each conferee from the time switch and, via comparator circuits, a PCM sample is sent to the conferee. Since the selected PCM sample is not determined until all samples are compared, a frame delay is required after which all conferees except the selected conferee will receive the selected PCM sample from the previous frame. The selected conferee, in turn, receives a null code (perfect idle channel). To minimize speech clipping or selecting noise, two circuits, a preliminary and a preferred speaker preference circuit, are employed.

The preliminary preference circuit utilizes the identity of the previous selected speaker and after its PCM sample is compared, its binary weight is modified to the highest value of a corresponding curve segment. This is done by adding a bit between the segment and the step bits, allowing the binary value to be decreased. This technique permits the conference circuit to hold on to the previous speaker if the incoming PCM samples are in the same PCM segment or below in value.

The preferred speaker preference circuit functions when the magnitude of the present PCM sample exceeds the value of the preferred preference circuit threshold. When a speaker is selected for the succeeding frame and has a larger PAM (smaller PCM code) sample than the threshold, a preferred preference circuit creates a lower binary weight (apparently larger PAM) to the comparator, for the selected speaker, for a period of one frame. This reduces speech clipping during the time when two or more conferees are conversing simultaneously.

Neither the preliminary nor the preferred preference circuits alters the incoming or the outgoing PCM sample to the conferees; additional binary weights are only presented to the comparison circuit to favor the previous speaker.

SUMMARY OF THE INVENTION

The present invention is intended to provide improvements in the conference circuit taught in the above-referenced U.S. patents, to reduce or substantially eliminate the problem of high idle channel noise resulting from always choosing the largest signal above null code (quiet or absence of signal), the distortion of signals to the listeners and distortion of the speaker side tone, and finally, difficulties from foreign signals.

In experience with the previous inventions, it has been discovered that a major contribution to the speech quality degradation in digital conferencing is due to signal reflections of the original signal circulating and fighting for control of the conference. This problem of signal reflections could be solved by providing either reflective signals of low amplitude in relation to the primary or with no or very little phase shift. However, assuming present hybrid designs must be maintained and termination impedance with wide variations will exist, the solution is shifted to the conference. To provide transmission of only the primary signal, a continuous threshold is established to pass the primary and exclude the reflection. It is only used in the selection process. For conditions which do not provide the threshold being met, the previous speaker is retained. For three-port applications, this requires a memory for each time slot with logic to store the results of this decision and to be used for the same time slot during the next frame. The memory then in combination with the threshold barrier allows the conference to lock to the speaker regardless of what he is saying until someone else takes over. The idle channel noise is helped as only one source is sent so no amplification exists due to previous selections of the noise peaks of the sampled conferences. The side tone distortion is solved as only one signal will pass. The single speaker is improved as long as the reflections are below the threshold. This, then, is critical to system performance. If the threshold is too low, the problems exist (threshold is null). If it is too high, the speaker cannot enable the selection to the proper level. A long trunk connection may have quite a bit of loss, so a compromise in level must be made. A variable threshold strapping is provided in the disclosure to provide for optimum applications.

In the previous three-port conference, the distortion to the listeners was caused by the primary signal being compared to a reflected signal from a second listener. When the primary signal saw a zero crossing, the reflected signal, being out of phase (90° to 270° being the worse case), took over the conference, thus resulting in distortion. The speaker would hear his own signal reflected from two listeners. If the listeners' terminations caused a phase shift between each other, the speaker's received signal would be also distorted giving him side tone distortion. The threshold now allows the speaker's signal to cross through zero without loss of conference control, and the reflected signal (or noise) does not achieve the threshold, so only one is selected and held.

Multiple speaker operation still provides flip-flop operation and is very rapid as compared to echo suppressor type flip-flopping or speaker phone operation. Thus, the loss of syllables is not heard, however, one may notice the shift of background noise levels, especially if one has a background signal like a radio.

The problem of foreign signals entering conference connections via trunk connections is improved, and can be seen in low level variations on which the idle circuit signal or voice signal ride. The conference requires a common DC reference (null code) to judge the presence of signals. Trunk circuits which allow low frequency signals at low level (60Hz or its harmonics, for example) to be present have caused distortion in the instant speaker case. This is because the larger speaker is always chosen. With the conference circuit of the present invention, the constant switch is greatly reduced, by an improved locking method. The foreign signal is still present but it is not chopped up due to switching between idle channels.

The present invention also is applicable to a multiport conference and such an application of the principle (that of digital conferencing using threshold level comparison and last speaker memory) of the present invention is disclosed in a copending U.S. patent application, Ser. No. 857,168, filed simultaneously herewith. The three-port conference is really three two-port connections of a single conference, and the system allows for 96 such two-port connections in memory. The multiple port (10, however, it is not necessary to limit the system to any number) is a single conference of 10 and has only one last speaker. The three-port decision, since it is a choice of two sources for each of the three listeners, needs no detection of the listener, while the ten-port needs to exclude the listener.

Generally in the three-port conference system, the conference circuitry includes a delayed time slot address buffer, a last frame speaker memory, two threshold speaker comparators, and various combination logic gates. Also included are pull-up resistors and four straps to determine the coded threshold level.

In operation, the previous saved data is read from the last frame speaker memory under control of the networks time slot counter, as buffered by the delayed time slot address buffer. This previously-saved data is available to the combinational logic, and the speaker A's four highest PCM bits are compared to the strapped threshold by one of the two threshold speaker comparators and its output indicates if the threshold for speaker A is achieved. Likewise, the other one of the two threshold speaker comparators indicates if speaker B's four highest bits achieve the threshold. As only the larger of the two speakers can still take over, a signal $A < B - 1$ generated by a seven bit PCM comparator included within the network is provided to the combinational logic to gate one of the thresholds to an OR gate. The output of this OR gate indicates that one of the two speakers has met the threshold and he is also the largest during this frame. This condition disables the previous speaker data, and also enables the gating of the speaker B conditioned. Since only a level is needed, speaker B is either the speaker or it must be speaker A. Then a second OR gate included within the combinational logic indicates the results to the speaker flip-flop within the network. The output of the speaker flip-flop (after hold bits modification) is loaded into the last frame speaker memory for the next frame. This operation occurs 96 times every frame, and provides 96 two-port decisions. The network time slot counter generates addresses from 0 to 95, and the last frame speaker memory uses only these locations even though it is implemented using a 256 × 1 RAM.

To permit synchronous operation with the network PCM time switch, timing circuits are generated within the conference circuit which are derived from the network clock.

The circuitry of the present invention is implemented using integrated circuits of conventional design.

BRIEF DESCRIPTION OF THE DRAWINGS

FIG. 1 comprises a diagram of the conference circuit; and

FIG. 2 comprises a diagram of the related portion of a switching system network.

DESCRIPTION OF THE PREFERRED EMBODIMENT

Figure 1:
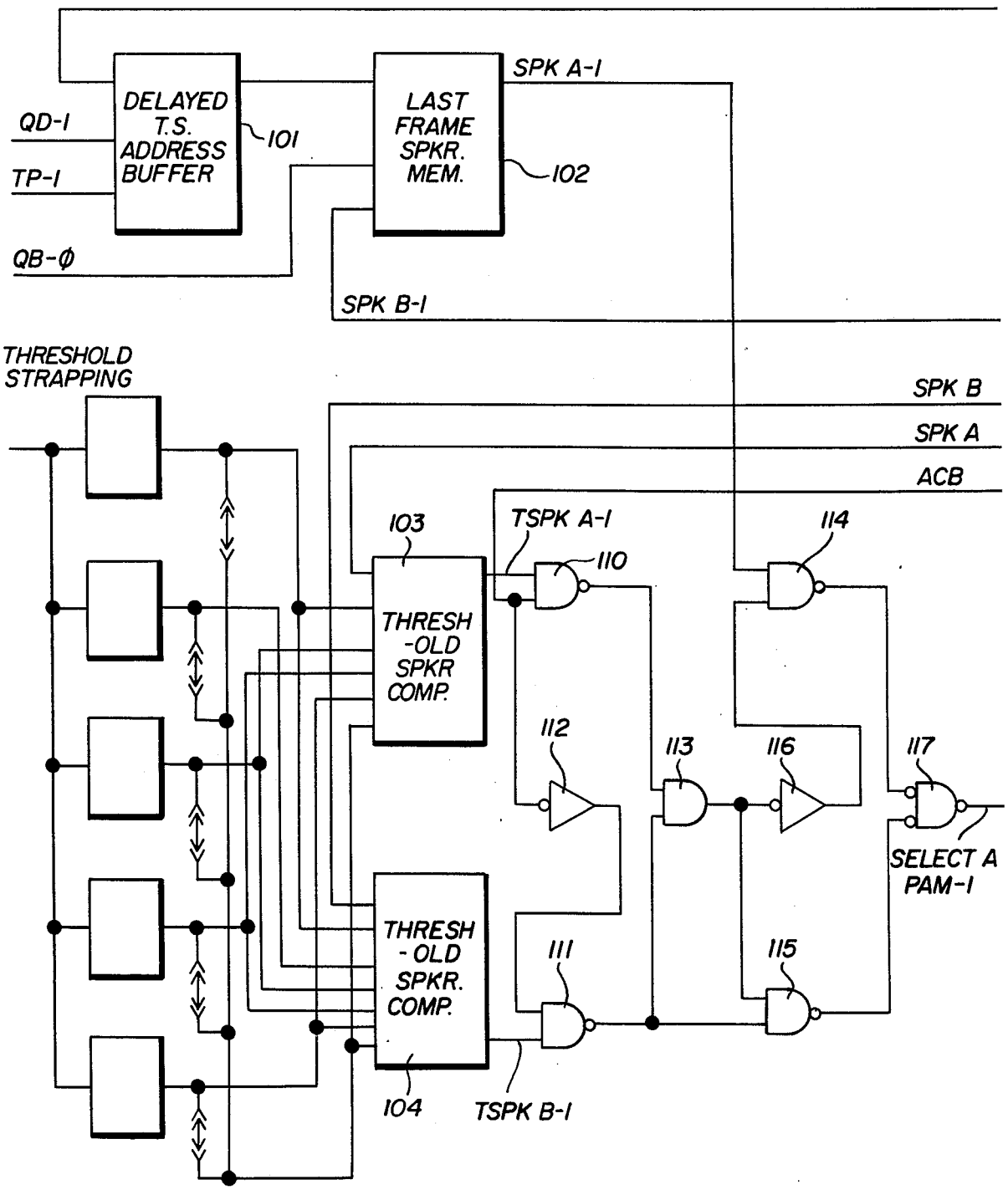
FIGS. 1 and 2 in combination, with FIG. 1 placed to the left of FIG. 2, comprise a functional and logic diagram of a conference circuit connected to the switching network of a telephone system employing pulse code modulation.
Figure 2:
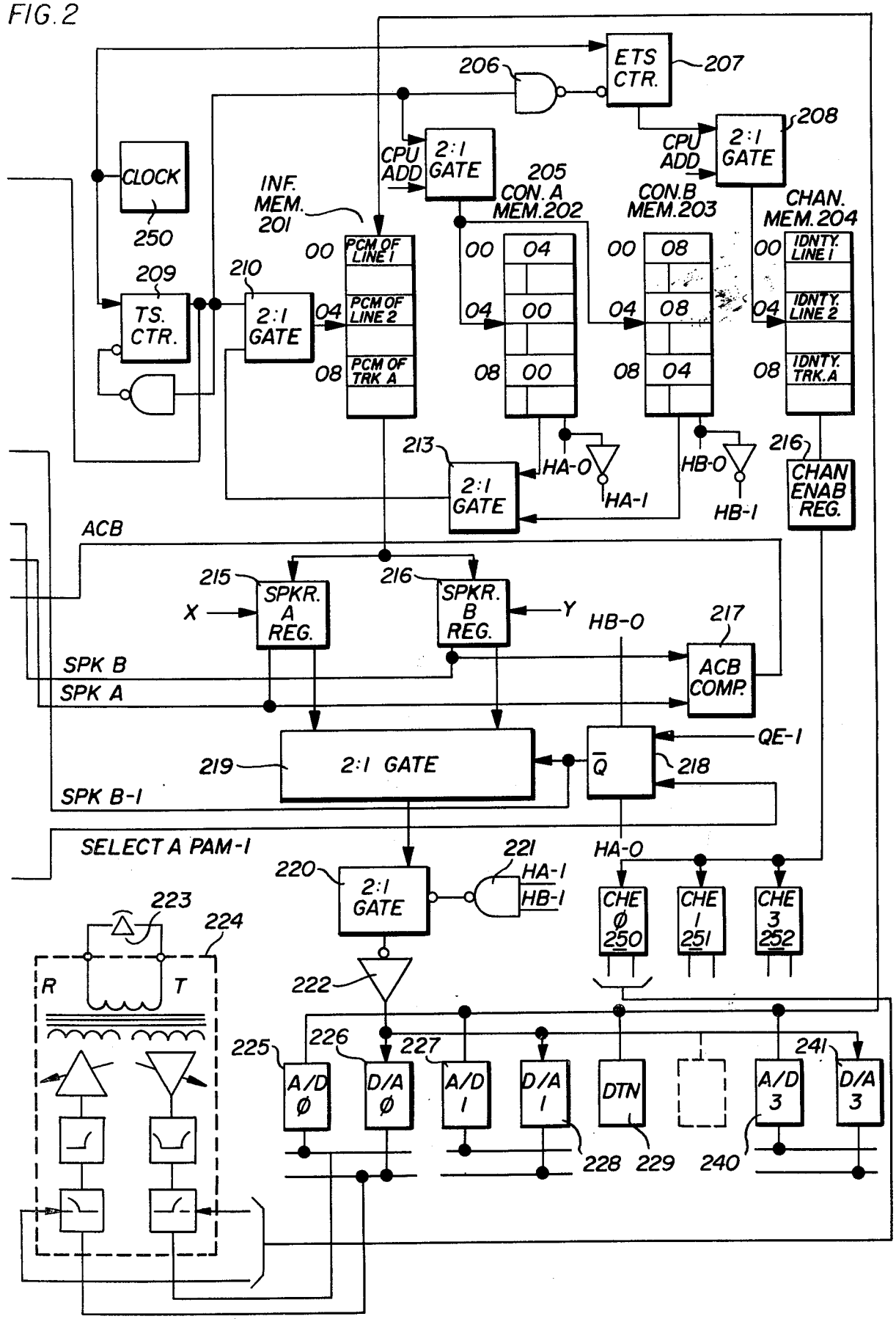

Implementation of the present invention is accomplished by means of circuitry arranged in logic configuration as shown in FIGS. 1 and 2. It should be noted that detailed circuit configurations of such circuitry have not been shown inasmuch as they do not form a portion of the present invention. It is well within the capability of those skilled in the art to implement the required functional circuitry based on the state-of-the-art technology. Commercially available logic circuitry is available to facilitate such implementation.

Referring now to FIG. 1, a conference circuit in accordance with the present invention is shown. The conference circuit includes a delayed time slot address buffer 101 whose output is connected to a last frame speaker memory 102. The delayed time slot address buffer 101 is driven by the network's time slot counter 209 and is clocked in response to QD pulses. The previously saved data in the last frame speaker memory 102 is read therefrom under control of the time slot counter 209 as buffered by the delayed time slot address buffer 101. This previously saved data is available to the combinational logic at the one input of the 2-input NAND gate 114. The output of the speaker A register 215 is coupled to the input of the threshold speaker comparator 103, and the speaker A's four highest PCM bits are compared to the strapped threshold. Likewise, the output of the speaker B register 216 is coupled to the threshold speaker comparator 104, and the speaker B's four highest PCM bits are compared to the strapped threshold. If the threshold is achieved by the speaker A, the threshold speaker comparator 103 provides an output signal TSPKA-1 to one input of the 2-input NAND gate 110. Correspondingly, if the speaker B achieves the threshold, the threshold speaker comparator 104 provides an output signal TSPKA-1 to one of the inputs of the 2-input NAND gate 111.

The outputs of the speaker A register 215 and the speaker B register 216 also are coupled to the comparator 217 which compares the speaker A's and speaker B's PCM signals and, if the speaker A's PCM signal is larger (less binary value) than the speaker B's PCM signal, provides a signal $A<B-1$ at its output to the other input of the NAND gate 110. This signal likewise is coupled through an inverter 112 to the input of the NAND gate 111. The outputs of the NAND gates 110 and 111 are both coupled to the 2-input NAND gate 113 which functions as an OR for low signals. The $A<B-1$ signal coupled to the NAND gates 110 and 111 gates one of the threshold signals to the NAND gate 113, and its output indicates that someone has met the threshold and also is the largest signal during this frame during the present time slot. The output of the NAND gate 113 is coupled through an inverter 116 to the input of the NAND gate 114, and is also directly coupled to the input of the NAND gate 115. The output of the NAND gate 113 disables the previous speaker data at the gate 114, and also enables the speaker B conditioned to gate 115.

Since only a level is needed, speaker B is either the speaker or it must be speaker A. The outputs of the gates 114 and 115 are coupled to the input of the NAND gate 117, which also functions as an OR for low signals, and this NAND gate 117 presents the results to the speaker flip-flop 218 of the network. The $\overline{Q}$ output of the speaker flip-flop 218 is loaded into the last frame speaker memory 102 for the next frame.

The pull-up resistors 105-109 and the straps A-E provide a variable threshold strapping arrangement, the results of which are coupled to the threshold speaker comparators 103 and 104 to establish a threshold value.

Referring now to FIG. 2, those portions of a switching network of a PABX employing pulse coded modulated transmission techniques and digital switching on a time division basis which interfaces with the conference circuit of the present invention as shown. Such circuitry includes an information memory 201, a control A memory 202, a control B memory 203 and a channel memory 204. Each memory has a capacity of 768 bits (96 words of eight bits each). Information stored in the information memory 201 is derived from the PCM outbus-1 which has connections to analog-to-digital converters such as 225, 227 and 240 and also from digital tone circuitry 229. Control of the information memory 201 is from clock source 250 which drives time slot counter 209 and inputs to 2:1 steering gate 210 and information gate through 2:1 steering gate 213 whose inputs are connected to control A memory 202 and control B memory 203 outputs. The output of steering gate 213 is inputed to the steering gate 210. Information stored in the information memory 201 is distributed during X and Y pulses, respectively, to speaker A register 215 and speaker B register 216, both of which include outputs connected to the input of 2:1 steering gate 219.

The speaker A register 215 and the speaker B register 216 have an output connection to the comparator 217 and to the threshold speaker comparators 103 and 104 of the conference circuit, respectively. The output of comparator 217 indicates when the information stored in speaker A register 215 is less than (PAM signal is larger than) the information stored in speaker B register 216; and is transmitted to the speaker flip-flop 218 and to the gates 110 and 111 of the conference circuit. The speaker flip-flop 218 which is also controlled by HB-0 and HA-0 signals produces a speaker B output signal which is used to control the 2:1 gate circuit 219 and the last frame speaker memory 102 of the conference circuit. The output of the 2:1 gate 219 is connected to the 2:1 steering gate 220. Control of gate 220 is via the NAND gate 221 whose inputs are the HA-1 and HB-1 signals. The output from gate 220 is connected to digital-to-analog circuit 226, 228 and 241 via gate 222. The channel memory 204 is driven by an early time slot counter 207 which is reset earlier by decode gate 206 which decodes the time slot counter 209. The 2:1 steering gate 208 then drives the channel memory to allow channel identity stored in it which includes conferee identities to be outputed to the channel enable register 214 and then to be distributed to channel enable circuits 250, 251 and 252. Pulse amplitude modulated transmission and receive buses provide connections between conference line circuits such as 224, which are gated by channel enable equipment 250-252 via leads T-EN and R-EN.

Referring now to FIGS. 1 and 2 in combination, the operation being described assumes the switching network of FIG. 2 has been already set up by an associated central processor to allow for a conference of three conferees. The method by which the call has been established is not important, and could result from such types of conference applications as progressive, meet me, or attendant (operator) conference. The typical application is for two PABX lines and a trunk, or three lines. Two trunks and a line are possible also. This is considered to be PBX three-way calling conferences. The progressive, etc., are more multi-party applications. In systems as previously referenced, such determination is all software controlled and results in a network configuration as shown in FIG. 2. The conferees may be served by lines, trunks, or might be a PBX attendant or operator.

In the network configuration shown, the conferees' equipment identity is stored in the channel memory 204. This location defines its associated time slot and allows signals stored in the channel enable register 216 ahead of the channel enabling circuitry to generate, transmit enable (T-EN) and receive enable (R-EN) pulses to a conferee's circuit such as 224. The control A memory 202 of the same time slot (i.e., same memory word address of the channel memory 204 word with the identity) has the hold bit "off" and the first speaker's two-slot address. A control B memory then must have a hold bit also "off" and the second speaker's time slot address. A 3-way connection will use three time slots of two speakers each.

For purposes of the present discussion, assume the connections illustrated, in the information memory 201, the control A memory 202, the control B memory 203 and the channel memory 204. As illustrated, it indicates that line 1 (time slot 0) will hear both the PCM code of line 2 (time slot 4) and the PCM code of trunk A (time slot 8). Likewise, line 2 (time slot 4) will hear both the PCM code of line 1 (time slot 0) and the PCM code of trunk A (time slot 8). Also, trunk A (time slot 8) will hear both the PCM code of line 1 (time slot 0) and the PCM code of line 2 (time slot 4). These are the three conference operations between the speaker A and the speaker B PCM codes accomplished every frame by the conference circuitry of FIG. 1 which forms the 3-way conference.

Now, assume for this frame, that line 1 has said nothing and null code (perfect quiet signal, with no DC offset) is stored in location 0 of the information memory 201. Also, that line 2 has said something which was coded above the threshold and that the trunk party has said something also above the threshold but below that of line 2. This is only an instant sample of code level, not actual measured tone level. The three decision processes are as follows.

TIME SLOT 0

The speaker A is line 2 and the PCM code stored in the information memory 201 is coupled therefrom to the speaker A register 215 and to the threshold speaker comparator 103. Since it was assumed that line 2 has said something which was coded above the threshold, the output (TSPKA-1) of the threshold speaker comparator 103 is true. The speaker B is trunk A and the stored PCM code is coupled from the information memory 201 to the speaker B register 216 and to the threshold speaker comparator 104. Again, the output (TSPKB-1) of the threshold speaker comparator 104 will be true, since it was assumed that the trunk party has said something also above the threshold but below that of line 2. The output of the speaker A register 215 and the speaker B register 216 also is coupled to the comparator 217 and, assuming the conditions indicated, the output (A<B−1) of the comparator 217 is true (larger signals have smaller PCM code values). Since both inputs to the gate 110 are true, the gate 110 is enabled and its output goes low and is coupled to the one input of the NAND date 113. Since A<B−1 is true at this time, the NAND gate 111 is not enabled and its output is high and is coupled to the NAND gate 113. The output of the NAND gate 113 therefore is true and, as indicated above, this indicates that someone has met the threshold and is also the largest speaker during this frame. The output of the NAND gate 113 is coupled through the inverter 116 to the input of the NAND gate 114 thus disabling the NAND gate 114, and hence the previous speaker data from the last frame speaker memory 102. The outputs of both the gates 113 and 111 being high forces the output of the NAND gate 115 to go low. Accordingly, with the output of the gate 114 high, and that of gate 115 being low, the output of the NAND gate 117 is then high which allows the selection of speaker A's PCM (select A PCM-1). The output (select A PCM-1) of the NAND gate 117 is coupled to the select flip-flop 218 and sets it during QE. The $\bar{Q}$ output (SPKB-1) of the select flip-flop 218 is then low and is coupled to the last frame speaker memory 102 wherein it is stored during QB of the next time slot (i.e., time slot 1). However, the delayed time slot address buffer 101 is still at count 0 since it will not change until QD, so the results of the time slot 0 are stored in location 0. The output of the last frame speaker memory 102 inverts so a high will be read out during the next frame when time slot 0 next occurs.

TIME SLOT 4

During this time slot, the speaker A is line 1 and the speaker B is trunk A. Since, as assumed, line 1 has said nothing (perfect idle channel) and the trunk A has said something above the threshold, when the outputs of the speaker A register 215 and the speaker B registers 216 are coupled to the respective threshold speaker comparators 103 and 104, the output of the threshold speaker comparator 103 (TSPKA-1) is low and the output of the threshold speaker comparator 104 (TSPKB-1) is high. Also, since the speaker B is greater than speaker A, the output of the comparator 217 (A<B) is low. In this case, the output of the NAND gate 110 will be high, while the output of the NAND gate 312 will be low. The output of the NAND gate 113 therefore again is high and the NAND gate 114 is disabled. Now, since the output of the NAND gate 111 is low, and the output of the NAND gate 113 is high, the output of the NAND gate 115 is forced to go high to, in turn, force the output of the NAND gate 117 (select A PCM) to go low. Since the output of the NAND gate 117 is low, the select flip-flop 218 will be reset during QE, to select speaker B's PCM. The $\bar{Q}$ output (SPKB-1) of the select flip-flop 218 will be high and stored in location 4 of the last frame speaker memory 102 during QB of time slot 5.

TIME SLOT 8

During time slot 8, the speaker A is line 1 and the speaker B is line 2. Since it is assumed that line 1 said nothing and that line 2 had said something which was coded above the threshold, when the outputs of the speaker A register 215 and the speaker B register 216 are coupled to the threshold speaker comparators 103 and 104, the output of the threshold speaker comparator 103 (TSPKA-1) is low, and the output of the threshold speaker comparator 104 (TSPKB-1) will be high. Also, speaker B is greater than speaker A (less in code value) so the output of the comparator 217 (A<B) will be low. The output of the NAND gate 110 will be high and the output of the NAND gate 111 will be low, thus the output of the NAND gate 113 is high and when coupled through the inverter 116 to the NAND gate 114, again disables the latter. The output of the NAND gate 113 being high and the output of the NAND gate 111 being low again forces the output of the NAND gate 115 to go high. The output of the NAND gate 115 therefore forces the output of the NAND gate 117 (select A PCM-1) to go low, to again select speaker B, via the select flip-flop 218. Accordingly, since the $\bar{Q}$ output of the select flip flop 218 (SPKB-1) is true, the latter is stored in location 8 of the last frame speaker memory 102 during the time slot 9.

Now, assume that line 1 again says nothing, that line 2 is below the threshold and trunk A is above the threshold. During the following frame, the sequence of events is as follows.

TIME SLOT 0

During time slot 0, the speaker A again is line 2 and the speaker B again is trunk A. Also, the output of the comparator 217 (A<B) is low. Accordingly, during this frame, the output of the threshold speaker comparator 103 (TSPKA) is low, while the output of the threshold speaker comparator 104 (TSPKB) is high. Therefore, since A<B is low, the output of NAND gate 110 is high and the output of NAND gate 111 is low, thus forcing the output of NAND gate 113 to go high. This high after being coupled through the inverter 116 disables the NAND gate 114 and its output goes high. The output of NAND gate 111 being low forces the output of NAND gate 115 to go high. Now, with both inputs to the NAND gate 117 being high, its output goes low, to select speaker B, via the select flip-flop 218. Since the $\bar{Q}$ output of the select flip-flop 218 (SPKB-1) is true, the latter is stored in location 0 of the last frame speaker memory 102 during the time slot 1.

TIME SLOT 4

During time slot 4, the speaker A again is line 2 and the speaker B is trunk A. Also, the output of the comparator 217 (A<B) is low. Therefore, the output of the threshold speaker comparator 103 is high, and that of the threshold speaker comparator 104 is low. This low upon being coupled to the NAND gate 115 forces its output to go high and when coupled to the NAND gate 117 likewise forces its output to go low, so that speaker B is directly selected, via the speaker flip-flop 218. Speaker B then is stored in the last frame speaker memory 102.

TIME SLOT 8

During time slot 8, the speaker A is line 1 and the speaker B is line 2. Neither speaker achieves the threshold, and the output of comparator 217 (A<B) is low. The output of the threshold speaker comparator 103 therefore is high, and the output of the threshold speaker comparator 104 is high. The NAND gate 113 through the inverter 116 provides a high to the NAND gate 114 to enable it, and a low to the NAND gate 115 to disable it. Now, the previous results are steered through the NAND gate 114 to the NAND gate 117 to select speaker B, via the speaker flip-flop 218. Speaker B again is stored in the last frame speaker memory 102.

Accordingly, it can be seen from the above description that the conference is made up of three decisions to update or reuse previous selections of speaker A or speaker B. A speaker can take over the other speaker, only by breaking through the established threshold level. Initially, it is a random selection, but as the first speaker speaks, the other two speakers flip to listen to him. The first speaker, however, hears one of the other two speakers depending on what is stored in the last frame speaker memory 102. His reflected signal will not change this if the threshold level is above the value of the reflected signal.

Foreign signals are also locked in or out depending upon the last speaker to achieve the threshold. Idle channel noise selections are also not a result of the in value but, instead, depend on who has control of each conference time slot.

Multiple talkers achieve the threshold and rely on rapid selection of speech peaks in combination of the intersyllabic pauses.

We claim:

1. In a pulse code modulated communication system, a plurality of communication channels arranged on a multiplexed basis, a switching system including a memory accessed by said communication channels, and comparison means for comparing and indicating as an output thereof the larger of two samples of information from a speaker A and a speaker B coupled to it, and a conference circuit connected to said memory and to said channels, said conference circuit comprising: a first threshold speaker comparator for comparing an established threshold level with samples of information from said speaker A and indicating as an output thereof that said samples of information from said speaker A exceeds said established threshold level; a second threshold speaker comparator for comparing said established threshold level with samples of information from said speaker B and indicating as an output thereof that said samples of information from said speaker B exceeds said established threshold value; and logic means comprising a plurality of gating means, said outputs from said first and second threshold speaker comparators and said comparison means being coupled to said logic means, said logic means being responsive to said outputs to select and to indicate to said switching system that one of said samples of information from said speaker A and speaker B that is larger in value when both said samples of information from said speaker A and said speaker B exceed said established threshold value.

2. In a pulse code modulated communication system, as claimed in claim 1, said conference circuit further comprising a last frame speaker memory for storing the identity of the one of said speakers A and B which was the active speaker during a preceding frame, the output of said last frame speaker memory being coupled to said logic means, said logic means further being responsive to said output from said last frame speaker memory to select and to indicate to said switching system during the next succeeding frame the one of said speakers A and B selected as the active speaker during the preceding frame when both said samples of information from said speakers A and B exceeds said established threshold level, whereby the active speaker during a previous frame is selected and retained as the active speaker during the next succeeding frame when both said samples of information from said speakers A and B exceed the established threshold level.

3. In a pulse code modulated communication system, as claimed in claim 2, said logic means further comprising gating means responsive to said output signals from said first and second threshold speaker comparators and from said last frame speaker memory to select and to indicate to said switching system the selection of the one of said speakers A and B that was the active speaker during the preceding frame when neither one of said samples of information from said speakers A and B exceeds said established threshold level, whereby the same active speaker during a previous frame is selected and retained as the active speaker during the next succeeding frame when neither of said samples of information from said speaker A nor B exceeds the established threshold level.

4. In a pulse code modulated communication system, as claimed in claim 2, said logic means further comprising gating means responsive to said output signals from said first and second threshold comparator means and from said last frame speaker memory to select and to indicate to said switching system the selection of the one of said speakers A and B having the samples of information which exceeds said established threshold level when only one of said speakers A and B has a sample of information which exceeds said threshold level, whereby only the speaker having a sample of information that exceeds the threshold level is selected regardless of which speaker was the active speaker during a preceding frame.

5. In a pulse code modulated communication system, as claimed in claim 2, wherein said logic means comprises first gating means coupled to said first and second threshold speaker comparators and responsive thereto to indicate at the output thereof that one or both of said speakers A and B has exceeded said established threshold level; an output gating means having an output indicating the selection of one of said speakers A and B; a second gating means having inputs coupled to the outputs of said last frame speaker memory and said first gating means and an output coupled to an input of said output gating means, said second gating means normally being operative to couple the output of said last frame speaker memory to said output gating means to operate the latter to select and to indicate the selection of the one of said speakers A and B that was the active speaker during the preceding frame in accordance with the output of said last frame speaker memory, said second gating means being disabled by the output of said first gating means indicating that the sample of information of one or both of said speakers A and B has exceeded said established threshold level, whereby the selection of the speaker that was the active speaker during a preceding frame as the active speaker during the next succeeding frame is prevented when the sample of information of one or both of the speakers A and B exceeds the established threshold level.

6. In a pulse code modulated communication system, as claimed in claim 5, wherein said logic means further comprises a third gating means responsive to the outputs of said first threshold speaker comparator and said comparison means to indicate to said first gating means at the output thereof that the sample of information of said speaker A has exceeded said established threshold level and is larger in value than the sample of information of said speaker B; a fourth gating means responsive to the outputs of said second threshold speaker comparator and said comparison means to indicate to said first gating means at the output thereof that the sample of information of said speaker B has exceeded said established threshold level and is larger in value than the sample of information of said speaker A; and a fifth gating means operated in response to the outputs of said first gating means and said fourth gating means to operate said output gating means to select and to indicate to said switching system to selection of speaker B, whereby the speaker B is selected as the active speaker when one or both of the samples of information of said speakers A and B exceed the established threshold level and the sample of information of said speaker B is larger than the sample of information of said speaker A.

7. In a pulse code modulated communication system, as claimed in claim 6, said conference circuit further comprising delayed time slot address buffer means coupled to said last frame speaker memory for operating the latter to output the identity of the active speaker during a preceding frame to said second gating means.

8. In a pulse code modulated communication system, as claimed in claim 2, said conference circuit further comprising means coupled to the respective ones of said first and second threshold speaker comparators for providing a variable threshold level.

* * * * *